US012741451B2

(12) United States Patent
Nielsen et al.

(10) Patent No.: US 12,741,451 B2

(45) Date of Patent: Sep. 22, 2026

(54) ARRANGEMENT WITH ILLUMINABLE PANE

(71) Applicant: SAINT-GOBAIN GLASS FRANCE, Courbevoie (FR)

(72) Inventors: Tobias Nielsen, Herzogenrath (DE); Semjon Mooraj, Herzogenrath (DE); Mathieu Berard, Herzogenrath (DE); Claire Davis, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 191 days.

(21) Appl. No.: 18/834,509

(22) PCT Filed: Jan. 27, 2023

(86) PCT No.: PCT/EP2023/051958

§ 371 (c)(1),
(2) Date: Jul. 30, 2024

(87) PCT Pub. No.: WO2023/144282

PCT Pub. Date: Aug. 3, 2023

(65) Prior Publication Data

US 2025/0108587 A1 Apr. 3, 2025

(30) Foreign Application Priority Data

Jan. 31, 2022 (EP) .................................... 22154364

(51) Int. Cl.
*B32B 17/10* (2006.01)

(52) U.S. Cl.
CPC .. *B32B 17/10761* (2013.01); *B32B 17/10045* (2013.01); *B32B 17/1011* (2013.01);
(Continued)

(58) Field of Classification Search
CPC ........ B32B 17/10761; B32B 17/10045; B32B 17/1011; B32B 17/10348;
(Continued)

(56) References Cited

U.S. PATENT DOCUMENTS

| | | | | |
|---|---|---|---|---|
| 11,269,128 B2 * | 3/2022 | Chen | .................... | G02B 6/0053 |
| 11,619,777 B2 * | 4/2023 | Haring | ................ | G02B 6/0095 362/147 |

(Continued)

FOREIGN PATENT DOCUMENTS

| | | |
|---|---|---|
| CN | 108027532 A | 5/2018 |
| CN | 111487706 A | 8/2020 |

(Continued)

OTHER PUBLICATIONS

International Search Report as issued in International Patent Application No. PCT/EP2023/051958, dated Apr. 18, 2023.

(Continued)

*Primary Examiner* — Tahseen Khan

(74) *Attorney, Agent, or Firm* — CUSHMAN PARTNERS, LLC

(57) ABSTRACT

An arrangement, includes an illuminable pane having a first main surface and an opposite second main surface, an illuminating device for generating light, the illuminating device being configured such that at least part of the light generated by the illuminating device is incident on the first main surface in such a manner that it can pass the illuminable pane and leave the illuminable pane at the second main surface, a reflective structure arranged at the second main surface, provided with a plurality of reflective surfaces for the reflection of light, the reflective surfaces being in the form of inclined surfaces that are coated with a reflective layer, the reflective surfaces being configured such that at least part of the light leaving the second main surface can be
(Continued)

Figure 1:
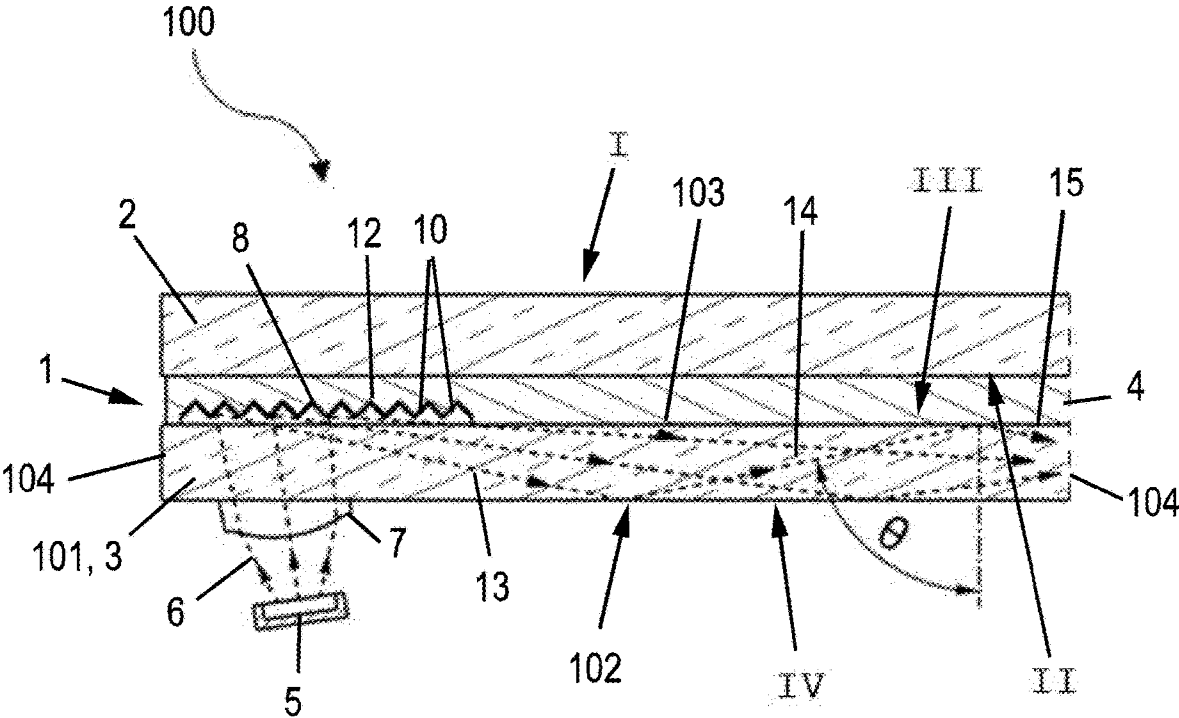

reflected into the illuminable pane at such an angle that total reflection of the reflected light takes place in the illuminable pane.

21 Claims, 6 Drawing Sheets

(52) U.S. Cl.
CPC .. *B32B 17/10348* (2013.01); *B32B 17/10541* (2013.01); *B32B 17/1066* (2013.01); *B32B 17/1077* (2013.01); *B32B 17/10788* (2013.01)

(58) Field of Classification Search
CPC .......... B32B 17/10541; B32B 17/1066; B32B 17/1077; B32B 17/10788
USPC .......................................................... 428/141
See application file for complete search history.

(56) References Cited

U.S. PATENT DOCUMENTS

| | | | | |
|---|---|---|---|---|
| 12,392,952 | B2 * | 8/2025 | Mooraj | G02B 6/005 |
| 2012/0026573 | A1 | 2/2012 | Collins et al. | |
| 2015/0260994 | A1 * | 9/2015 | Akutsu | G02B 27/0172 385/37 |
| 2020/0241189 | A1 * | 7/2020 | Schabacker | G02B 6/001 |
| 2021/0132281 | A1 * | 5/2021 | Fattal | G02B 6/0035 |
| 2021/0255374 | A1 * | 8/2021 | Murakami | F21V 5/04 |

FOREIGN PATENT DOCUMENTS

| | | | |
|---|---|---|---|
| CN | 113613888 | A | 11/2021 |
| CN | 113940061 | A | 1/2022 |
| CN | 113966645 | A | 1/2022 |
| DE | 10 2005 007427 | A1 | 8/2006 |
| DE | 10 2005 049081 | B3 | 6/2007 |
| DE | 10 2007 027296 | A1 | 12/2008 |
| DE | 10 2013 001334 | A1 | 7/2014 |
| EP | 0 876 608 | B1 | 4/2002 |
| JP | 2011-134650 | A | 7/2011 |
| JP | 2018-142530 | A | 9/2018 |
| WO | WO 2007/077099 | A1 | 7/2007 |
| WO | WO 2011/033313 | A1 | 3/2011 |
| WO | WO 2012/007334 | A1 | 1/2012 |
| WO | WO 2020/188078 | A1 | 9/2020 |

OTHER PUBLICATIONS

First Office Action as issued in Chinese Patent Application No. 202380008208.5, dated Feb. 28, 2026.

Notice of Reasons for Rejection as issued in Japanese Patent Application No. 2024-545124, dated Dec. 9, 2025.

* cited by examiner

ARRANGEMENT WITH ILLUMINABLE PANE

CROSS-REFERENCE TO RELATED APPLICATIONS

This application is the U.S. National Stage of PCT/EP2023/051958, filed Jan. 27, 2023, which in turn claims priority to European patent application number 22154364.8 filed Jan. 31, 2022. The content of these applications are incorporated herein by reference in their entireties.

The invention relates to an arrangement with an illuminable pane and to a method for its manufacture and use.

Laminated composite panes are manufactured in large numbers in industrial series production, for example for windshields in motor vehicles. They comprise an outer pane, an inner pane and a thermoplastic intermediate layer which bonds the outer pane to the inner pane over the entire surface. Typical intermediate layers are films made of polyvinyl butyral, which, in addition to their adhesive properties, have high toughness and high acoustic damping. The interlayer prevents the laminated glass from disintegrating in the event of damage. The laminated pane only develops cracks, but remains dimensionally stable. In addition to laminated panes, single panes are also used, which have been given increased impact and shock resistance compared to normal flat glass by tempering. Such single panes, which are also commonly referred to as "single-pane safety glass", are used, for example, as side or roof panes in motor vehicles.

Laminated panes with electrically switchable optical properties are known in the prior art. Such laminated panes generally contain an electro-optical functional element, typically an active layer between two surface electrodes. The optical properties of the active layer can be changed by a voltage applied to the surface electrodes. An example of this are electro-chromic functional elements, known for example from US20120026573 A1 and WO 2012007334 A1. Another example are SPD functional elements (SPD=Suspended Particle Device), known for example from EP 0876608 B1 and WO 2011033313 A1. The transmission of visible light through the electro-optical functional element can be controlled by the applied voltage, whereby such an adjustment of the optical properties is related to the external light conditions, but does not enable independent illumination of the composite panes.

Illumination of panes is often desirable, for example in vehicle construction, where two-dimensional pane illumination, pane contour illumination, accent illumination or function illumination have a very attractive effect and, in the case of function illumination, are consequently also necessary to enable the user to control a particular function even in the dark.

For the decorative lighting of panes and, e.g., for the backlighting of displays, it is known to couple light at the edge surface of a pane and to use the total reflection of the coupled light occurring at the optical boundary surfaces of the pane. The pane thus serves as a light guide for the coupled light. For example, WO 2007/077099 describes a composite pane in which light is coupled into a polycarbonate layer at an edge surface through an optical waveguide, the coupled-in light is totally reflected at the interfaces of the polycarbonate layer and scattered at dome-shaped scattering centres.

In practice, coupling light at the edge surface of a pane leads to a satisfactory result, especially for illuminating the pane homogeneously over its entire surface, since the light can be coupled efficiently over the entire edge surface. However, in certain applications, light cannot be coupled into the pane at the edge surface, for example in the case of panes that are glued into a pane frame, such as roof panes of motor vehicles. Such panes usually also have an edge surface with a circular grinding ("C-grinding"), which prevents efficient light coupling, since the coupling of light at an edge surface typically requires a smooth or flat pane edge.

Another way to couple light into a pane is for example described in US2020241189A1. The light can be coupled into a luminous glazing having a pane and a light source. The light of the light source is injected into the pane via one of the main surfaces of the pane. A light deflecting element is arranged on the other main surface of the pane opposite the light source. The light deflecting element deflects light emanating from the light source back into the pane, so that the light is guided within the pane by total reflection. The light deflecting element is, for example, a microprismatic film attached to the pane. In addition, the edges of the pane can be provided with a reflective coating to prevent loss of the injected light via the edges of the pane.

US20210132281A1 discloses a polychromatic grating-coupled backlight for an electronic display comprising a plate light guide configured to guide light, a light source and a grating coupler configured to receive, diffractively split, and redirect the light of the light source into the plate light guide. The light source can be arranged on one main side of the plate light guide, while the grating coupler is arranged on the other main side of the light guide opposite the light source. The grating coupler consists preferably of ridges or grooves which are on or in the surface of the pane. Additionally, the grating coupler may contain a grating material having a different refractive index than that of the pane. The grating material is, for example, filled into the grooves of the grating coupler.

US20150260994A1 discloses an optical device intended as part of a head mounted display. The optical device comprises a light guide, a light source and a deflection unit having a holographic diffraction grating for injecting light of the light source into the light guide. Alternative illuminative glazing is shown in WO2020188078A1 and CN113940061A.

The present invention is therefore based on the object of avoiding the above-mentioned disadvantages and also enabling planar homogeneous illumination in the case of panes in which lateral coupling of the light at an edge surface is not possible, or at least not possible in an efficient manner. The illuminated pane should be easy and inexpensive to manufacture in industrial series production.

These and further objects of the present invention are solved according to the proposal of the invention by an arrangement with illuminable pane according to claim 1. Advantageous embodiments of the invention are apparent from the sub-claims.

The invention discloses an arrangement with an illuminable pane. The arrangement comprises an illuminable pane which is configured as a planar light guide and, thus, is suitable for guiding light by means of total reflection in the pane. The pane is flat. For example, the pane is a flat glass pane. The illuminable pane may be non-curved or curved. The two main surfaces of the pane are, for example, parallel.

In case the pane is non-curved, the pane has a similarly non-curved plane. In case the pane is curved, a local tangential non-curved plane can be constructed at each point of each of the two main surfaces of the pane.

The pane has a (circumferential) edge surface which connects the two opposite main surfaces.

The edge surface is, for example, perpendicular to the two main surfaces, but can, e.g., also be rounded. The term "main surface" is used to clearly distinguish it from the circumferential edge surface. Preferably, the illuminable pane is transparent. Preferably, the illuminable pane is suitable and provided for planar homogeneous illumination.

In the arrangement according to the invention, the illuminable pane serves as a planar light guide and is suitable for guiding light by means of total reflection of light coupled into the pane, whereby the two main faces or surfaces of the pane each form an optical interface with the surroundings (e.g. air or thermoplastic material such as polyvinyl butyral) at which optical interfaces total reflection of the light coupled into the pane can take place. Essential for the function as optical interface is a difference in the optical refractive index, related to the wavelength of the incident light, of the substances adjacent to the interface. Total reflection occurs when the angle of light incident on an optical interface is sufficiently large (as measured with respect to the normal to the interface). Consistent with the common usage of the term, "total reflection" refers to the reflection of light at an optical interface caused by a difference of the optical refractive index of the materials forming the optical interface. The total reflection thus is not a reflection on a reflective surface (mirror).

The arrangement further comprises an illuminating means for generating light for illuminating the illuminable pane, wherein the illuminating means is configured such that light generated by the illuminating means impinges on the first main surface of the illuminable pane. The illuminating means is preferably arranged on the first main surface. The light generated by the illuminating means preferably impinges exclusively on the first main surface when it is coupled into the illuminable pane for the first time. In any case, the light generated by the illuminating means is not coupled into the illuminable pane at the edge surface of the illuminable pane, i.e., at a side edge of the illuminable pane. Accordingly, the light generated by the illuminating means is also not coupled into the illuminable pane for the first time at the second main surface.

Specifically, the light generated by the illuminating means is coupled into the illuminable pane at the first main surface in such a way that at least part of the light is not subject to total reflection in the pane, but passes through the illuminable pane and leaves the illuminable pane at the second main surface. If the light generated by the illuminating means hits the first main surface in a divergent form (i.e. beam cone), a centre beam of the divergent beam cone is directed in such a way that no total reflection of the centre beam occurs in the illuminable pane, but that the centre beam passes the illuminable pane and exits the illuminable pane at the second main surface. In this case, the centre beam can, e.g., be directed perpendicular to the first main surface. Similarly, it is also possible for the centre beam to be directed at an angle other than 90° (i.e., oblique) to the first main surface, as long as it is ensured that the centre beam is not subject to total reflection in the illuminable pane when the light generated by the illuminating means is coupled into the illuminable pane at the first main surface. If the light generated by the illuminating means hits the first main surface in a collimated (directed) form, i.e., with a parallel beam path, the collimated light beam is directed in such a way that no total reflection of the collimated light beam occurs in the illuminable pane, but that the collimated light beam passes the pane and exits the illuminable pane at the second main surface. The collimated light beam may, e.g., be directed perpendicular to the first main surface. Similarly, it is also possible that the collimated light beam is directed at an angle different from 90° (i.e., oblique) to the first main surface, as long as it is ensured that the collimated light beam is not subject to total reflection in the illuminable pane when the light generated by the illuminating means is coupled into the illuminable pane at the first main surface.

The illuminating means according to the invention may also include lenses, mirrors, reflectors or other light-conducting elements that serve to couple the light at the first main surface into the illuminable pane. Particularly advantageously, the illuminating means includes a collimator configured to direct light generated by the illuminating means in a collimated manner (i.e., with a parallel beam path) onto the first main surface.

The illuminating means is configured such that at least part of the generated light, in particular all generated light, is incident on the first main surface in such a manner that it can pass the illuminable pane and leave the illuminable pane at the second main surface. The light hitting the first main surface of the illuminable pane may hit the first main surface at a right angle (perpendicular to the illuminable pane) and/or at angles that are different from the right angle (oblique).

Advantageous illuminating means include, for example, laser diodes, light-emitting diodes (LEDs), or incandescent bulbs, and the invention encompasses any type of illuminating means or a particular use. The illuminating means may be suitable for generating coloured or white light. In principle, the illuminating means may also be designed to generate light in the ultraviolet range or infrared range. Preferred colours of light are, for example, red (because of its pronounced signalling effect), green (because of the high sensitivity of the human eye to the green colour spectrum) and blue (because of its particularly aesthetic and low-glare effect).

In the case of a movable pane, such as an openable roof pane of a motor vehicle, the illuminating means is preferably connected to the illuminable pane and is also movably arranged. It is understood that the illuminating means may also be installed independently of the illuminable pane and any panes connected thereto.

The arrangement further comprises a reflective structure for reflecting light generated by the illuminating means and leaving the illuminable pane at the second main surface, after passing the illuminable pane without prior total reflection in the illuminable pane. The reflective structure is arranged on the second main surface of the illuminable pane. Advantageously, the reflective structure has a thickness (dimension measured perpendicular to the illuminable pane) in the range of 5 μm to 2 mm, in particular 25 μm.

The reflective structure comprises a plurality of reflective surfaces which are in the form of inclined surfaces that are coated with a reflective layer suitable for reflecting light, preferably light in a wavelength range from 400 nm to 800 nm. Stated more particularly, the inclined surfaces are inclined with respect to the illuminable pane. This means, that in case of a non-curved pane, the inclined surfaces are inclined with respect to the plane of the pane. Otherwise, in case of a curved pane, each of the inclined surfaces is inclined with respect to a local tangential plane which can be constructed at each point of the second main surface adjacent to the inclined surface. Typically, the reflective surfaces have many different orientations with respect to the illuminable pane. Preferably, the reflective layer is an electrically conductive layer. The reflective layer is typically a layer of a metallic material such as silver (Ag) or aluminium (Al). The reflective layer is suitable for reflecting light generated by the illuminating means. Preferably, the reflective structure does not introduce a strong degree of diffraction to the reflected light. The structure is therefore preferably a lot bigger than the longest wavelength of light used within the system.

Preferably, the reflective surfaces reflect the light incident on them by means of direct reflection. The reflective surfaces thus form a smooth surface on which most, preferably at least 70%, particularly preferably at least 80%, more particularly preferably at least 90%, most particularly preferably at least 98% of the incident light is reflected and directed in a certain direction (direct reflection). This type of reflection differs from other types of reflection, for example reflection by diffraction of light. The reflectance describes the proportion of the total light that is reflected. It is given in % (related to 100% irradiated light) or as a unitless number from 0 to 1 (normalised to the irradiated light. In the context of the present invention, the statements on the degree of reflection (or percentages of reflection) with respect to light refer to the degree of reflection measured with an angle of incidence of 0° to the illuminable pane in the area of the reflective structure. The angle of incidence is measured in relation to the surface normal at the first main surface of the illuminable. The information on the reflectance or the reflectance spectrum refers to a reflectance measurement with a light source that emits uniformly in the spectral range under consideration with a normalised light intensity of 100%.

According to an advantageous embodiment of the invention, the reflective surfaces having a diameter of 1 μm to 500 μm, preferably, 10 μm to 100 μm, particularly preferably of 20 μm to 35 μm. The diameter of the reflective surfaces may be uniform or may vary. The values given are the arithmetic mean of all the diameters if there is no uniform diameter for all the reflective surfaces. In the specified range, light reflection is particularly high and homogeneous, with no unwanted reflection effects, such as light diffraction.

The reflective structure is a planar (curved or non-curved) structure providing a plurality of inclined reflective surfaces which are distributed over the area of the reflective structure. The inclined reflective surfaces have many orientations with respect to the illuminable pane.

As detailed above, at least part of the light generated by the illuminating means is coupled into the illuminable pane at the first main surface in such a way that it can pass the illuminable pane (without total reflection at an optical interface of the pane) and, thus, leaves the illuminable pane at the second main surface. The reflective structure is configured such that at least part of the light which passes the illuminable pane and leaves the pane at the second main surface can be reflected back into the pane by the reflective surfaces. The light leaving the illuminable pane at the second main surface thus is coupled into the illuminable pane a second time.

Furthermore, the reflective structure is configured such that at least part of the light leaving the illuminable pane at the second main surface is reflected back into the illuminable pane at such an angle that a total reflection takes place in the illuminable pane at the optical interfaces of the illuminable pane (i.e., at the first main surface and the second main surface). Thus, at least part of the light is coupled into the illuminable pane on one side of the illuminable pane and, after passing through the illuminable pane without total reflection occurring, is reflected back into the illuminable pane by the reflective structure on the other side of the illuminable pane in such a way that at least part of the light reflected back into the pane by the reflective structure is henceforth subject to total reflection in the illuminable pane, i.e. is reflected back into the illuminable pane in such a manner that the angular condition for total reflection in the illuminable pane is met. Due to the many orientations of the reflective surfaces with respect to the illuminable pane, at least a large proportion of the light incident on the first main surface can be reflected back into the illuminable pane at the second main surface fulfilling the angular condition for total reflection.

The arrangement according to the invention thus advantageously enables the illuminable pane to be used as a planar (curved or non-curved) light guide, with light being coupled (reflected back) into the pane by the reflective structure in such a way that the angular condition for total reflection in the pane is satisfied for light reflected back into the pane. If the light generated by the illuminating means is divergently incident on the first main surface, most of the generated light will pass through the pane without total internal reflection and can be reflected back into the pane by the reflective structure in such an angle that it is subject to total internal reflection at the optical interfaces of the pane. Accordingly, at least part of the light incident on the reflective structure can be reflected back into the pane for total internal reflection. This is even more true if collimated light of the illuminating means hits the first main surface of the pane. The illuminable pane thus serves as a light guide and can be illuminated, especially in a planar homogeneous manner. Particularly advantageously, the light can be coupled into the pane at one of the two main surfaces, so that coupling at an edge surface of the pane is not necessary. These are major advantages of the arrangement according to the invention.

Decoupling of the light guided in the illuminable pane from the illuminable pane can be achieved by scattering the light, e.g., in the region of the main surfaces. For example, one main surface or both main surfaces may each be provided with one or more scattering structures at which light scattering of the light totally reflected in the pane takes place so that light can be scattered from the pane. In principle, a scattering structure is configured in such a way that the condition for total reflection at the scattering structure no longer applies. For this purpose, one or both of the main surfaces of the pane can, for example, be provided with a local roughening acting as scattering structure. Such scattering structures can be provided as desired at the first and/or second main surface. The skilled person is familiar with measures for decoupling totally reflected light from a light guide (see, e.g., WO 2007/077099), so that it is not necessary to go into this here in more detail.

Particularly preferably, the light generated by the illuminating means is collimated by a collimator and impinges in a collimated (directed) form on the first main surface, so that a particularly high proportion of the generated light can be reflected back into the pane by the reflective structure (after passing through the pane without total reflection) and is then subject to total internal reflection in the pane.

According to an advantageous embodiment of the arrangement according to the invention, the reflective structure is arranged opposite to the illuminating means in perpendicular view through the illuminable pane. Consequently, the illuminating means is located on one side of the illuminable pane and the reflective structure is located on the other side of the illuminable pane. This enables a particularly simple practical realization of the arrangement according to the invention.

According to an advantageous embodiment of the arrangement according to the invention, the reflective structure is formed by a reflective body that is different from the illuminable pane. Thus, the reflecting body can be individualized with respect to the illuminated pane and can be provided in a prefabricated manner. The reflective body is thus not partially formed by the illuminable pane (see below). The reflective structure configured as reflective body is arranged on the second main surface and is preferably attached to the illuminable pane, for example by bonding. This measure enables a particularly simple design of the reflective structure. The reflective body does not necessarily have to be firmly connected to the pane by a connecting means (e.g., by bonding). Instead, it may be envisaged that the reflective body is not firmly connected to the pane by a connecting means, for example if the reflective body is laminated into a composite pane (see below).

Preferably, the reflective structure configured as reflective body is in the form of a microprismatic film provided with a reflective layer suitable for light reflection, which for example is bonded to the second main surface of the pane. Such microprismatic film is commercially available and is also known to the skilled person under the term "reflective film". Such microprismatic film has microscopically small bodies, so-called micro-prisms, which serve to direct light. The microprisms provide the inclined surfaces of the reflective structure. The surface of the microprismatic film is subsequently coated with a reflective layer suitable for light reflection, which can be done by common coating processes, so that the microprisms are provided with a reflective layer on their surface. The microprismatic film coated with the reflective layer does not necessarily have to be firmly connected to the pane by a bonding agent (e.g., by bonding). Rather, it can also be provided that it is not firmly connected to the pane by a connecting means, for example when it is laminated into a composite pane (see below).

The reflective structure configured as reflective body is preferably arranged directly on the second main surface of the illuminable pane, wherein the reflective body and the pane may for example, have direct contact, optionally separated only by a fastening means (e.g., an adhesive bond) for fastening the reflective structure to the pane. Preferably, the microprisms are located between the reflective layer and the illuminable pane.

According to an alternative embodiment of the arrangement according to the invention, the inclined surfaces of the reflective structure at the second main surface are formed by the illuminable pane itself, i.e., the inclined surfaces are formed by the pane in the region of the reflective structure on the second main surface. For obtaining the reflective structure, the inclined surfaces are coated with the reflective layer suitable for light reflection, which can be done by common coating methods. Preferably, the reflective structure is additionally inclined with respect to the illuminable pane. In this context "with respect to the illuminable pane" means that the reflective structure is formed in such a way that it is inclined to the general orientation of the plane of the illuminable pane. In case the pane is non-curved, the pane has a similarly non-curved plane. In case the pane is curved, a local tangential non-curved plane can be constructed at each point of each of the two main surfaces of the pane. For the purpose of determining the orientation of the plane, the contribution of the reflective structure is negligible.

According to an embodiment of the arrangement according to the invention, the planar (curved or non-curved) reflective structure is inclined with respect to the illuminable pane, i.e., the plane of the reflective structure is inclined with respect to the plane of the illuminable pane. As a result, a distance between the inclined reflective surfaces and the second main face increases along at least one direction so that light reflected from a reflective surface and having a directional component in the at least one direction may not be shadowed by adjacent reflective surfaces. Advantageously, the proportion of light that can be reflected into the illuminable pane to then be totally reflected in the illuminable pane can be increased.

According to an advantageous embodiment of the arrangement according to the invention, the reflective structure consists of a material whose optical refractive index is equal or at least approximately equal to the optical refractive index of a material of the illuminable pane. This measure advantageously enables optical refraction at the reflective structure to be avoided or at least largely avoided when the light generated by the illuminating means passes into the reflective structure at the second main surface of the pane, so that reflection only occurs at the reflective layer of the reflective structure. In particular, a total reflection at an optical interface between the illuminated pane and the reflective structure configured as reflective body (optical transition: pane-reflective structure) caused by a difference in the refractive index can be avoided.

According to an advantageous embodiment of the arrangement according to the invention, the illuminable pane is a glass pane.

The illuminable pane is configured, for example, as a single pane not connected to further panes, in particular as toughened safety glass which has been provided with a particularly high impact strength and break resistance by tempering.

It is equally possible for the illuminable pane to be part of a laminated composite pane. The laminated pane comprises an outer pane and an inner pane, which are joined together by lamination via an intermediate layer. The terms outer pane and inner pane are used only to distinguish a first pane and a second pane. In the case of use of the composite pane as a vehicle pane or as a building pane, the outer pane preferably but not necessarily faces the outer space of the composite pane and the inner pane faces the inner space.

Preferably, the illuminable pane is the inner or outer pane of the composite pane, particularly preferably the inner pane of the composite pane. In this case, it is preferred that the outer pane is tinted and in particular opaque and/or that the intermediate layer is tinted and in particular opaque. This allows a very attractive design of the composite pane, in which the inner pane is subjected to a particularly homogeneous planar illumination.

It is also possible and preferred that the illuminable pane is laminated between the inner pane and the outer pane in the composite pane. During manufacture, the illuminable pane is preferably sandwiched between two sheets of thermoplastic material (e.g., PVB sheets). In this case, it is preferred that the outer pane is tinted and/or the thermoplastic film arranged closer to the outer pane is tinted and in particular opaque. The intermediate layer is thus preferably coloured in sections, in particular opaque. This allows a very attractive design of the composite pane, in which the inner pane is subjected to a particularly homogeneous planar illumination.

The illuminable pane and/or the panes of the composite pane are preferably made of glass, particularly preferably soda-lime glass, as is customary for window panes. However, the panes may also be made of other types of glass, for example quartz glass, borosilicate glass or alumino-silicate glass, or of rigid clear plastics, for example polycarbonate, polyethylene terephthalate (PET) or polymethyl methacrylate. The panes can be made of non-tempered, partially-tempered or tempered glass. The thickness of the panes can vary widely and be adapted to the requirements in individual cases. Preferably, the thicknesses of the panes are from 0.1 mm to 10 mm and, in the case of glass, preferably from 1 mm to 5 mm, most preferably from 1.4 mm to 3 mm.

An illuminable pane made of polymeric material such as polyethylene terephthalate (PET) can, for example, be flexible and can have a low thickness of e.g., 0.2 mm or lower. Such illuminable pane is preferably laminated in a composite pane.

The illuminable pane and/or the panes of the composite pane may be generally clear and colourless, but may also be tinted, clouded or coloured.

The interlayer is formed by at least one thermoplastic interlayer film. The thermoplastic interlayer film comprises at least one thermoplastic polymer, preferably ethylene vinyl acetate (EVA), polyvinyl butyral (PVB) or polyurethane (PU) or mixtures or copolymers or derivatives thereof. The thickness of the intermediate layer and in particular of the thermoplastic bonding film is preferably from 0.2 mm to 2 mm, particularly preferably from 0.3 mm to 1 mm, for example 0.38 mm or 0.76 mm.

According to an advantageous embodiment of the arrangement according to the invention, the illuminating means, as seen vertically through the composite pane, is arranged in overlapping relationship with a black print applied to the outer or inner sheet. This makes it possible in an advantageous manner to conceal the illuminating means, so that the composite pane as a whole can be designed in a very visually appealing manner.

According to an advantageous embodiment of the arrangement according to the invention, an electrical functional layer, in particular an IR-reflective layer (reflective coating for the infrared range), or an electrical functional element is provided in the composite pane.

An electrical functional layer can be applied to a surface of the outer pane or to a surface of the inner pane, preferably on a surface facing the intermediate layer, in order to protect the coating from corrosion and mechanical action. Alternatively, the coating may be incorporated into the composite pane in the form of a coated thermoplastic film, for example of polyethylene terephthalate (PET). In this case, the coated film is preferably disposed between first and second thermoplastic interconnecting films.

IR-reflective coatings typically have at least one electrically conductive layer. The coating may additionally comprise dielectric layers, which serve, for example, to regulate the sheet resistance, to protect against corrosion or to reduce reflection. The electrically conductive layer preferably contains silver or an electrically conductive oxide (transparent conductive oxide, TCO) such as indium tin oxide (ITO). The electrically conductive layer preferably has a thickness of 10 nm to 200 nm. To improve conductivity while maintaining high transparency, the coating may have multiple electrically conductive layers separated by at least one dielectric layer. For example, the electrically conductive coating may contain two, three or four electrically conductive layers.

Typical dielectric layers include oxides or nitrides, for example silicon nitride, silicon oxide, aluminium nitride, aluminium oxide, zinc oxide or titanium oxide. It is understood that the electrically conductive coatings may also serve to electrically heat the pane.

In the arrangement according to the invention, the combination of the reflective structure with an IR-reflective layer may be particularly advantageous, since this may allow a particularly large amount of light to be reflected back into the illuminable pane by means of total reflection, and thus the light generated by the illuminating means does not have to be collimated as much in order to achieve the same effect without an IR-reflective layer.

The functional layer can also be an electrically heatable layer by which the laminated pane is provided with a heating function. Such heatable layers are known to the skilled person per se. They typically contain one or more, for example two, three or four, electrically conductive layers. These layers preferably contain or consist of at least one metal, for example silver, gold, copper, nickel and/or chromium, or a metal alloy and preferably contain at least 90% by weight of the metal, in particular at least 99.9% by weight of the metal. Such layers exhibit particularly advantageous electrical conductivity with simultaneous high transmission in the visible spectral range. The thickness of a single layer is preferably from 5 nm to 50 nm, particularly preferably from 8 nm to 25 nm. At such a thickness, an advantageously high transmission in the visible spectral range and a particularly advantageous electrical conductivity are achieved.

The electrical functional layer is preferably arranged on a surface of at least one pane and partially covers or covers the surface of the pane, but preferably over a large area. The term "over a large area" means that at least 50%, at least 60%, at least 70%, at least 75% or preferably at least 90% of the surface of the pane is covered by the functional layer. However, the functional layer may also extend over smaller portions of the surface of the pane. The electrical functional layer is preferably transparent to visible light. In an advantageous embodiment, the functional layer is a single layer or a layer structure consisting of several individual layers with a total thickness of less than or equal to 2 μm, particularly preferably less than or equal to 1 μm.

The electrical functional element can be an electro-optical component, such as an SPD element or PDLC element, as described at the beginning. Electro-optical components, such as SPD or PDLC elements, are commercially available as multilayer foils, where the active layer is arranged between two surface electrodes that are used to apply a voltage to control the active layer. In general, the two surface electrodes are arranged between two carrier films, typically made of PET. Commercially available multilayer films are also covered on both sides with a protective film made of polypropylene or polyethylene, which serves to protect the carrier films from soiling or scratching. During the manufacture of the laminated pane, the electro-optical component is cut out of the multilayer film in the desired size and shape and inserted between the films of an intermediate layer, by means of which two glass panes are laminated together to form the laminated pane. A typical application is windshields with electrically adjustable sun visors, which are known, for example, from DE 102013001334 A1, DE 102005049081 B3, DE 102005007427 A1 and DE 102007027296 A1.

For the purposes of the present invention, "transparent" means that the transmission for visible light is more than 70% and, in particular, of more than 75%. Accordingly, "opaque" means a light transmission of less than 15%, preferably less than 5%, in particular 0%.

A laminated pane is produced by lamination using conventional methods known per se to the skilled person, for example autoclave processes, vacuum bag processes, vacuum ring processes, calender processes, vacuum laminators or combinations thereof. The bonding of outer pane and inner pane, as well as additional illuminable pane if necessary, is usually carried out under the action of heat, vacuum and/or pressure.

The invention further extends to a method of manufacturing an arrangement with illuminable pane according to the invention as described above. The method according to the invention comprises at least the following steps:

(a) providing an illuminable pane having a first main surface and an opposite second main surface, (b) arranging an illuminating means for generating light at the first main surface, such that light generated by the illuminating means is incident on the first main surface in such a manner that it can pass the illuminable pane and leave the illuminable pane at the second main surface, (c) providing a reflective structure provided with reflective surfaces at the second main surface, the reflective surfaces being in the form of inclined surfaces, inclined with respect to the illuminable pane and being coated with a reflective layer, the reflective surfaces being configured such that light generated by the illuminating means can be reflected into the illuminable pane at such an angle that total reflection of the reflected light takes place in the illuminable pane.

Furthermore, the invention extends to the use of the arrangement according to the invention with illuminable pane in means of transport for traffic on land, in the air or on water, in particular in trains, ships and motor vehicles, for example as a windshield, rear window, side window and/or roof window, in buildings, in particular in the access area, window area, roof area or facade area, as a built-in part in furniture and appliances.

The various embodiments of the invention can be realized individually or in any combination. In particular, the features mentioned above and to be explained below can be used not only in the combinations indicated, but also in other combinations or alone, without leaving the scope of the present invention.

Figure 2A:
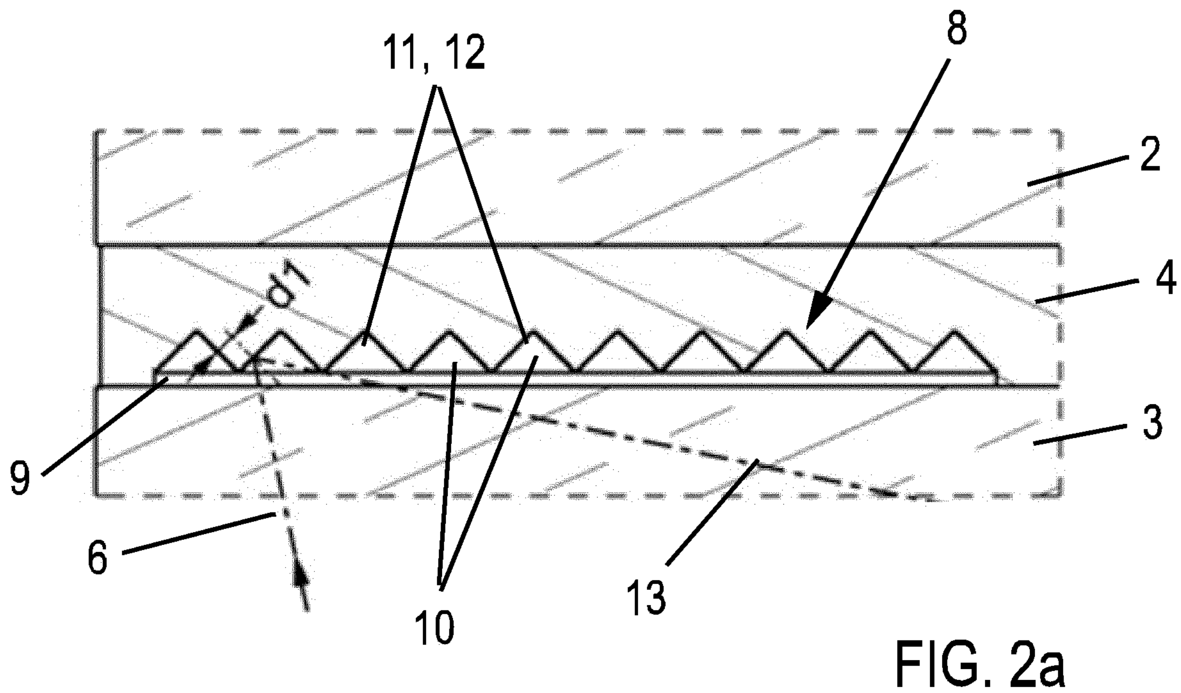
Figure 2B:
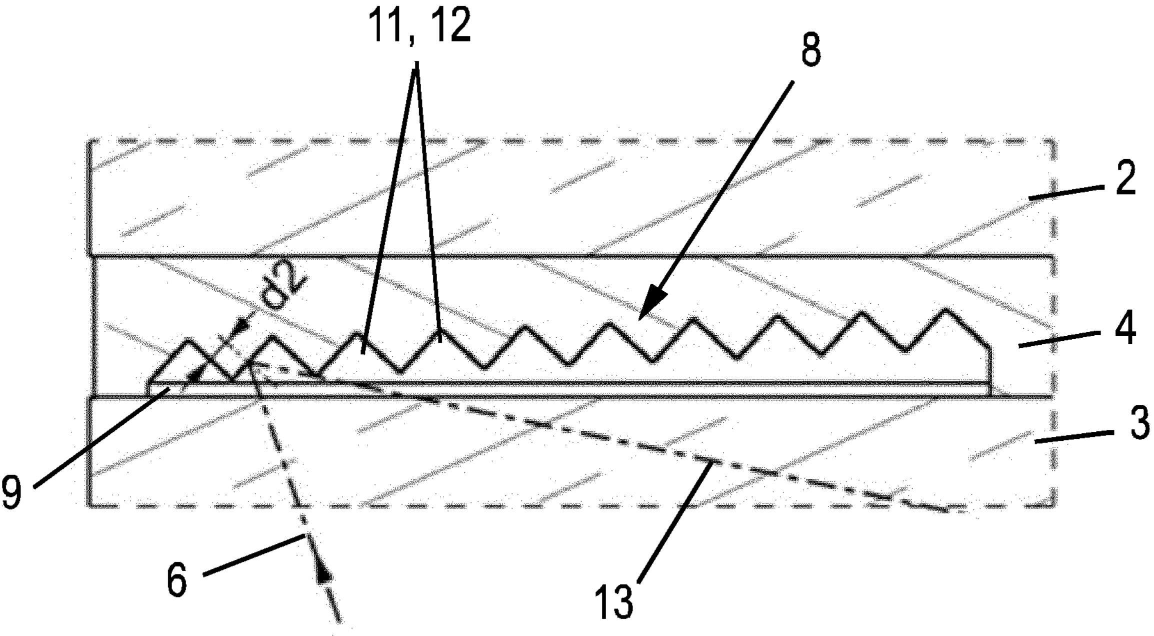

The invention is explained in more detail below by means of exemplary embodiments, with reference to the accompanying figures. Identical or identically acting elements are marked with the same reference sign. They show in simplified, not to scale representation:

FIG. 1 a sectional view of an exemplary embodiment of the arrangement according to the invention with illuminable pane in a composite pane, FIG. 2*a* an enlarged representation of a section of the arrangement of FIG. 1, FIG. 2*b* a modification of the arrangement of FIG. 2*a,*

Figure 6:
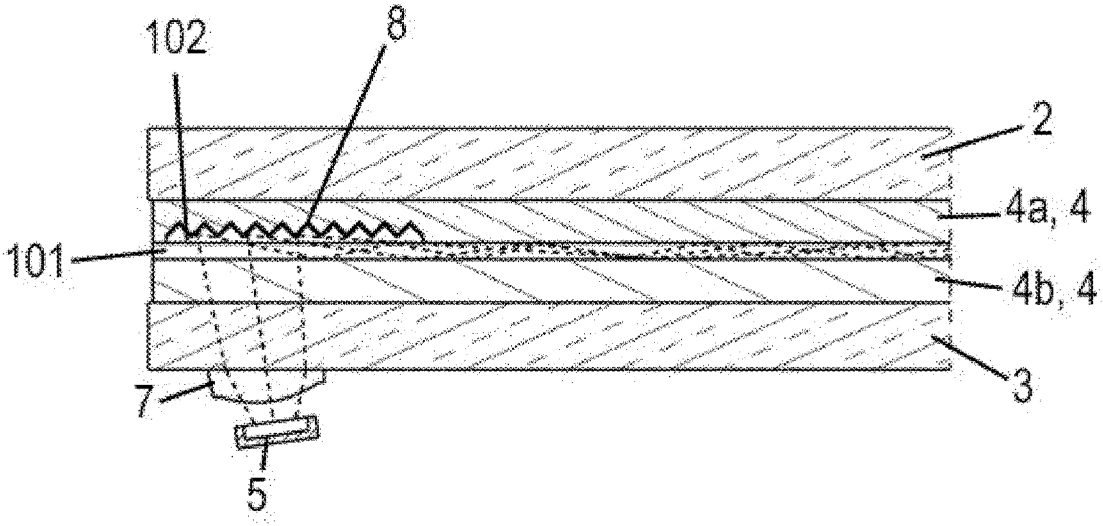
Figure 7:
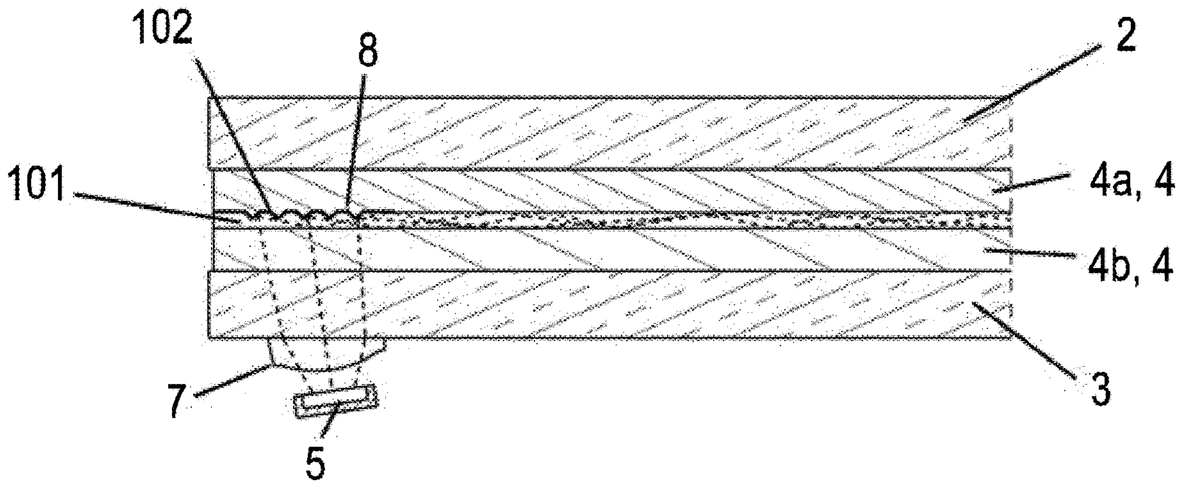
Figure 8:
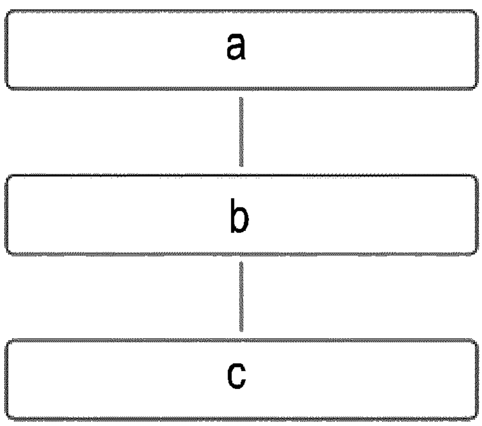

FIGS. 3 to 7 further embodiments of the arrangement according to the invention with illuminable pane in a composite pane, FIG. 8 a flow chart of the process according to the invention.

FIGS. 1 and 2*a* illustrate an embodiment of the arrangement according to the invention in total designated by the reference number 100. The sectional view corresponds to a section perpendicularly through the panes.

The arrangement 100 comprises a composite pane 1 with an outer pane 2 and an inner pane 3, which are connected to each other by a thermoplastic intermediate layer 4. The different sides of the outer pane 2 and inner pane 3 are designated by Roman numerals in conventional notation.

Here, the surface of the outer pane 2 facing the outer environment is designated as side I, the surface of the outer pane 2 facing the intermediate layer 4 is designated as side II, the surface of the inner pane 3 facing the intermediate layer 4 is designated as side III, and the surface of the inner pane 3 facing the inner environment is designated as side IV.

In the embodiment of the arrangement 100 shown in FIG. 1, the inner pane 3 of the laminated pane 1 serves as an illuminable pane 101 having a first main surface 102 (side IV) and an opposite second main surface 103 (side III). The two main surfaces 102, 103 are connected to each other by a frontal edge surface 104. The term "main surface" is used to distinguish it from the edge surface 104. In the exemplary embodiment of FIG. 1, the inner pane 3 is designed as an illuminable pane 101 in the sense of the invention. In order to emphasize this feature, the inner pane 3 is additionally marked with the reference signs dedicated for the illuminable pane 101.

Adjacent to or at the first main surface 102, an illuminating means 5 is arranged by means of which light 6 can be generated which is collimated by a collimator 7 and impinges in (directed) form on the first main surface 102 (side IV) of the illuminable pane 101 (i.e., inner pane 3). The light 6 coupled into the illuminable pane 101 at the first main surface 102 passes the illuminable pane 101 and, without prior total reflection in the illuminable pane 101, emerges from the illuminable pane 101 at the second main surface 103 (side III).

A reflective structure 8 is located at the second main surface 103 of the illuminable pane 101, which is formed here, for example, in the form of a prefabricated reflective body different from the illuminable pane 101. The reflective structure 8 comprises here, for example, a microprismatic foil 9 (shown in FIG. 2*a*), which has a foil-like carrier, not shown in greater detail, with microprisms 10 formed thereon, for example glass bodies, which are shown schematically here and in the further as triangles. It is essential that the microprisms 10 provide a plurality of inclined surfaces which are arranged obliquely or non-parallel to the plane of the composite pane 1 and illuminable pane 101. As detailed before, this can be understood as inclined with respect to the plane of the illuminable pane 101 in case the illuminable pane 101 is not curved, or inclined with respect to a local tangential plane which can be constructed at each point of the second main surface 102 adjacent to the inclined surfaces. Typically, microprisms 10 have reflective surfaces have many different orientations with respect to the illuminable pane 101. The microprismatic film 9 is coated with a metallic reflective layer 11, for example of silver or aluminium, suitable for reflecting light 6. The inclined surfaces thus become reflective surfaces 12 for the incident light 6. The reflective layer 11 is located on the side of the microprisms 10 facing away from the illuminable pane 101.

The reflective structure 8 is configured in such a way that light 6, which has been generated by the illuminating means 5 and coupled into the illuminable pane 101 at the first main surface 102, and leaves the illuminable pane 101 at the second main surface 103 (without prior total reflection in the illuminable pane 101), impinges on the reflective structure 8, i.e., on the reflective surfaces 12. Here, the light 6 passes through the microprisms 10. In the present embodiment, the reflective structure 8 is arranged in opposition to the illuminating means 5, with respect to a perpendicular view through the composite pane 1 at the location of the reflective structure 8.

At least part of the light 6 incident on the reflective surfaces 12 is reflected back by the reflective surfaces 12 as a first reflection light 13 into the illuminable pane 101, i.e., coupled into the illuminable pane 101 a second time. Due to the oblique positions of the reflective surfaces 12, the first reflection light 13 is reflected into the illuminable pane 101 at such angles that total reflection occurs in the illuminable pane 101. This is illustrated in FIG. 1, wherein the first reflection light 13 is totally reflected at the optical interface (e.g., glass-air) present at the first main surface 102 (side IV), resulting in second reflection light 14. The second reflection light 14 can in turn be totally reflected at the optical interface (e.g., glass-PVB) present at the second main surface 103 (side III), resulting in third reflection light 15, and so on. By scattering, the reflection radiation can leave the illuminable pane 101, whereby local scattering structures (e.g., roughening of the first main surface 102 and/or second main surface 103) can be provided for this purpose, which will not be discussed in more detail here. Essential to the invention is the coupling of the light 6 at the first main surface 102 into the illuminable pane 101 and the total reflection of the light 6 in the illuminable pane 101, in order to thereby enable a preferably homogeneous illumination of the illuminable pane 101. Consequently, it is not necessary and not intended to couple light 6 into the illuminable pane 101 at the edge surface 104.

In FIG. 1, an angle theta (e) of the second reflection light 14 relative to the perpendicular through the composite pane 1 or illuminable pane 101 is drawn as an example. The angle is such that total reflection of the second reflection light 14 occurs at the optical interface formed at the second main surface 103. It will be understood that the reflective surfaces 12 adopt a plurality of orientations, such that at least a portion of the light 6 may be reflected such that total internal reflection occurs in the illuminable pane 101. For example, if a pane 101 made of soda-lime glass and an intermediate layer 4 made of polyvinyl butyral (PVB) are used, the angle theta (Θ) is about 78°.

The outer pane 2 is transparent or tinted, preferably tinted. The intermediate layer 4 is transparent or opaque, preferably is tinted with a transmittance for light of more than 50%, so that the composite pane 1 with the illuminable inner pane 3 has a particularly attractive appearance.

In FIG. 2*a*, a section of the composite pane 1 of FIG. 1 is shown enlarged. As explained above, the microprisms 10 are schematically shown in section as triangles, and the shape of the microprisms 10 may be regular or irregular. Crucially, the microprisms 10 provide many oblique surfaces with different orientations such that total reflection of reflected light occurs in the illuminable pane 101.

With reference to FIG. 2*b*, a modification of the arrangement of FIGS. 1 and 2*a* is explained. To avoid unnecessary repetition, only the differences are explained. In FIG. 2*b*, a dimension d1 is drawn for the microprisms 10 shown schematically in section as triangles. The dimension d1 is to illustrate that the first reflection light 13 is not shadowed by an adjacent microprism 10 if the dimension d1 does not exceed a certain threshold value. As illustrated by FIG. 2*b*, the dimension d1 can advantageously be increased to a dimension d2 (d2>d1) if the microprismatic foil 9 is set obliquely relative to the plane of the illuminable pane 101. In FIG. 2*b*, the flat microprismatic foil 9 is inclined with respect to the illuminable pane 101 so that an edge region of the microprismatic foil 9—here, for example, further to the right—has a greater distance from the illuminable pane 101 than an edge region of the microprismatic foil 9—here, for example, further to the left. It is understood that this applies only to the microprisms 10 which are located in the direction of the greater distance from the illuminable pane 101. As a result, the proportion of light that can be reflected into the pane 101 fulfilling the condition of total internal reflection can advantageously be increased.

Figure 3:
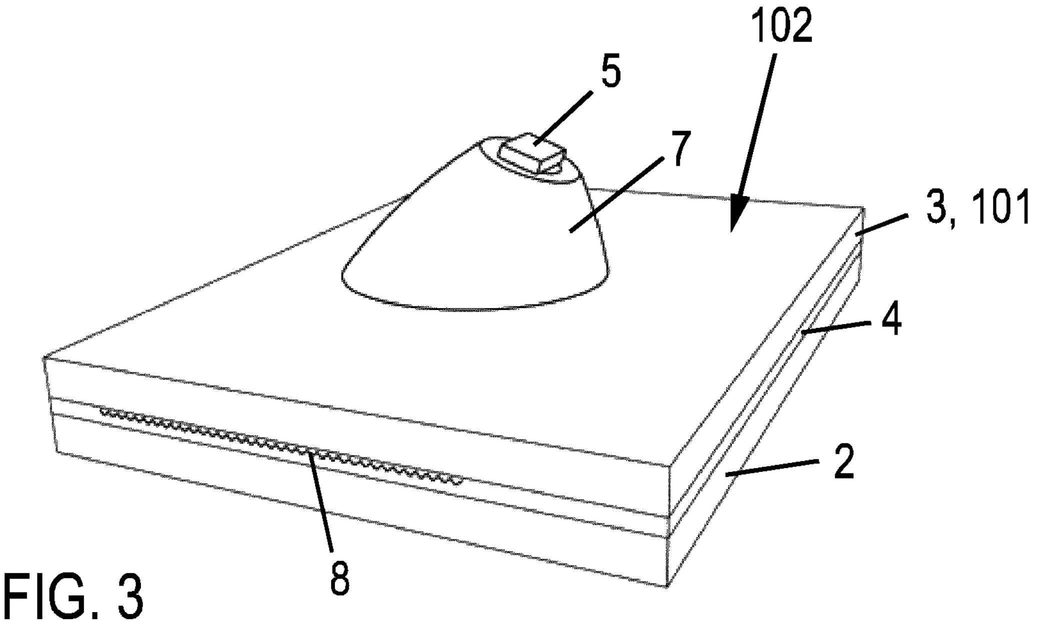

In FIG. 3, an embodiment of the arrangement 100 as illustrated with reference to FIGS. 1 and 2*a* is shown in a perspective view. Accordingly, the arrangement 100 comprises the illuminating means 5 with an associated collimator 7 for collimating the light 6 generated by the illuminating means. The illuminating means 5 with collimator 7 is attached to the first main surface 102 (side IV) of the illuminable pane 101.

Figure 4:
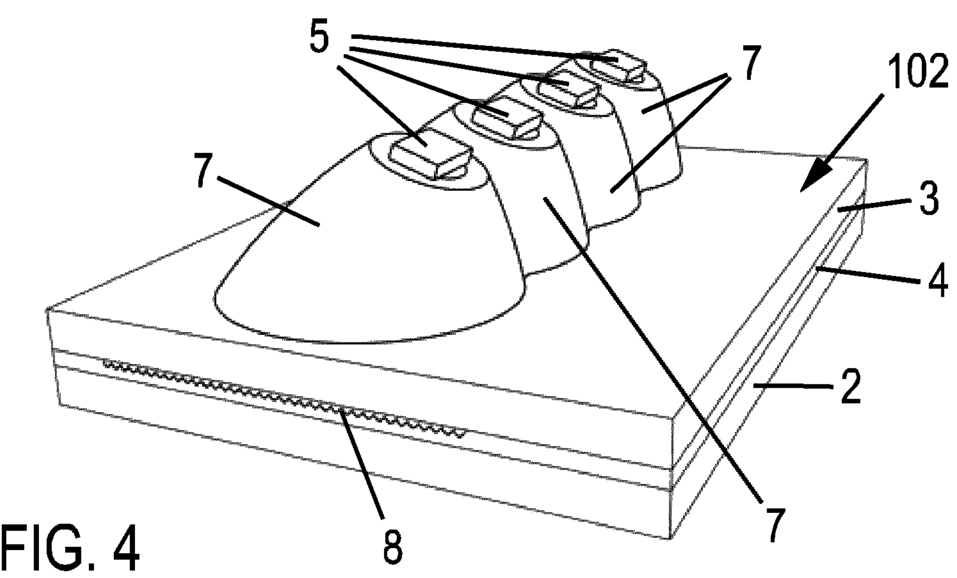

FIG. 4 illustrates a further embodiment of the arrangement 100, as illustrated with reference to FIGS. 1 and 2*a*, in a perspective view. Accordingly, the arrangement 100 comprises a plurality of illuminating means 5, each with an associated collimator 7, in a row-like arrangement. The illuminating means 5 with associated collimators 7 are attached to the first main surface 102 (side IV) of the illuminable pane 101. Due to the multiple illuminating means 5, the illuminable pane 101 can be illuminated more strongly and/or better in a planar-homogeneous manner.

Figure 5:
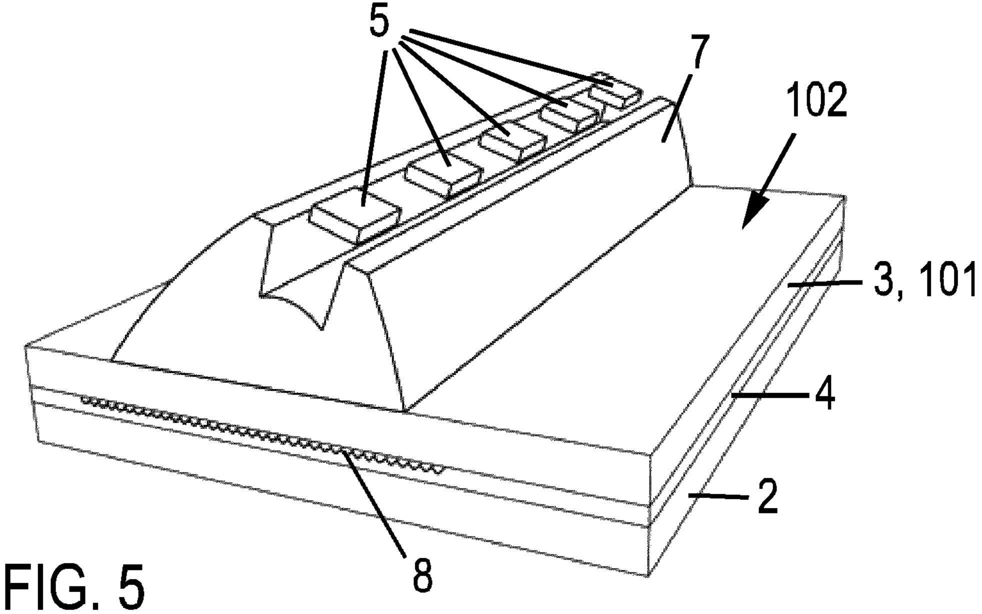

FIG. 5 illustrates a further embodiment of the arrangement 100, as illustrated with reference to FIGS. 1 and 2*a* or 2*b*, in a perspective view. Accordingly, the arrangement 100 comprises a plurality of illuminating means 5 associated with a common collimator 7 in a row-like arrangement. The illuminating means 5 with the associated collimator 7 are attached to the first main surface 102 (side IV) of the illuminable pane 101.

FIG. 6 illustrates a further embodiment of the arrangement 100, comprising a composite pane 1 with outer pane 2 and inner pane 3, which are connected to each other by an intermediate layer 4, as well as an illuminating means 5. In order to avoid unnecessary repetition, only the differences to the embodiment of FIG. 1 are explained. Accordingly, the composite pane 1 comprises an illuminable pane 101 which is formed as a further pane in addition to the inner and outer panes 2, 3. The illuminable pane 101 is located inside the intermediate layer 4 and has been embedded in sandwich form between two laminating films 4*a*, 4*b* made of thermoplastic material (e.g., PVB) during lamination. The laminating film 4*b* positioned closer to the inner pane 3 is transparent, whereas the laminating film 4*a* positioned further away from the inner pane 3 preferably has a transmittance for light of more than 50%. This is indicated by the hatching in FIG. 6. The outer pane 2 is transparent or tinted, preferably tinted. In the embodiment of FIG. 6, the reflective structure 8, as illustrated in FIGS. 1 and 2*a*, is formed as a separate reflective body which is arranged on the second main surface 103.

In FIG. 7, an alternative is illustrated. Accordingly, in an arrangement analogous to FIG. 6, the inclined surfaces of the reflective structure 8 are formed by the illuminable pane 101 at the second main surface 103. The correspondingly formed area of the illuminable pane 101 is then part of the reflective structure 8. The inclined surfaces have been coated with a reflective layer 11.

In the shown embodiments, the composite pane 1 may be provided with an opaque coating (not shown) such as a black print on one of the sides I to IV, wherein the illuminating means 5 is arranged in direct view through the composite pane 1 in an overlapping manner so that the illuminating means 5 is obscured by the opaque coating. Furthermore, the composite pane 1 can have a functional layer (not shown), in particular an IR layer, preferably on side II.

FIG. 8 illustrates the process according to the invention by means of a flow chart. The steps a), b) and c) concern:

(a) providing an illuminable pane having a first main surface and an opposite second main surface, (b) arranging an illuminating means for generating light at the first main surface, such that light generated by the illuminating means is incident on the first main surface in such a manner that it can pass the illuminable pane and leave the illuminable pane at the second main surface, (c) providing a reflective structure provided with reflective surfaces at the second main surface, the reflective surfaces being in the form of inclined surfaces, inclined with respect to the illuminable pane and being coated with a reflective layer, the reflective surfaces being configured such that light generated by the illuminating means can be reflected into the illuminable pane at such an angle that total reflection of the reflected light takes place in the illuminable pane.

As can be seen from the above description of the invention, the invention discloses a novel arrangement with illuminable pane in which light is coupled into the illuminable pane at one side of the illuminable pane and is reflected back into the illuminable pane at the other side of the illuminable pane by a reflective structure such that at least part of the reflected light undergoes total reflection within the illuminable pane. This makes it unnecessary to couple light at an edge surface of the illuminable pane into the pane, so that the illuminable pane can also be illuminated if the edge surface is not accessible by installing the pane (e.g., by installing it in the body frame of a motor vehicle). In addition, the edge surface does not have to be flat or even, but can in particular have a circular grind (C-grind).

LIST OF REFERENCE SIGNS

1 composite pane
2 outer pane
3 inner pane
4 intermediate layer
4*a*,4*b* laminating film
5 light source
6 light
7 collimator
8 reflective structure
9 microprismatic foil
10 microprism
11 reflective layer
12 reflective surface
13 first reflection light
14 second reflection light
15 third reflection light
100 arrangement
101 illuminated pane
102 first main surface
103 second main surface
104 edge surface

The invention claimed is:

1. Arrangement, comprising:

an illuminable pane having a first main surface and an opposite second main surface, an illuminating device configured to generate light, the illuminating device being configured such that at least part of the light generated by the illuminating device is incident on the first main surface in such a manner that light can pass the illuminable pane and leave the illuminable pane at the second main surface, a reflective structure arranged at the second main surface, provided with a plurality of reflective surfaces for the reflection of light, the reflective surfaces being in the form of inclined surfaces that are coated with a reflective layer, the reflective surfaces being configured such that at least part of the light leaving the second main surface can be reflected into the illuminable pane at such an angle that total reflection of the reflected light takes place in the illuminable pane.

2. The arrangement according to claim 1, wherein the reflective structure is arranged opposite the illuminating device in perpendicular view through the illuminable pane.

3. The arrangement according to claim 1, wherein the reflective structure consists of a material whose optical refractive index is equal to an optical refractive index of a material of the illuminable pane.

4. The arrangement according to claim 1, wherein the illuminating device has a collimator which is configured such that light generated by the illuminating device impinges in a collimated manner on the first main surface.

5. The arrangement according to claim 1, wherein the reflective structure comprises a reflective body arranged at the second main surface.

6. The arrangement according to claim 5, wherein the reflective body comprises a microprismatic film coated with the reflective layer.

7. The arrangement according to claim 1, wherein the inclined surfaces of the reflective structure are formed by the illuminable pane.

8. The arrangement according to claim 1, wherein the reflective structure is inclined with respect to the illuminable pane.

9. The arrangement according to claim 1, wherein the illuminable pane is a single pane not connected to further panes.

10. The arrangement according to claim 1, wherein the illuminable pane is part of a laminated composite pane, the composite pane comprising an outer pane and an inner pane which are connected to one another via an intermediate layer.

11. The arrangement according to claim 10, wherein the illuminable pane is the inner or outer pane of the composite pane or is laminated between the inner pane and the outer pane.

12. The arrangement according to claim 10, wherein the inner or outer pane is a tinted pane and/or the intermediate layer is a tinted intermediate layer which is tinted at least in sections and/or the illuminating device is arranged in perpendicular view through the composite pane in overlap with a black print arranged on the outer or inner pane.

13. The arrangement according to claim 10, wherein the composite pane has a functional layer.

14. A method for manufacturing an arrangement with illuminable pane according to claim 1, comprising:

(a) providing an illuminable pane having a first main surface and an opposite second main surface, (b) arranging an illuminating device configured to generate light at the first main surface, such that light generated by the illuminating device is incident on the first main surface in such a manner that light can pass the illuminable pane and leave the illuminable pane at the second main surface, (c) providing a reflective structure provided with reflective surfaces at the second main surface, the reflective surfaces being in the form of inclined surfaces, inclined with respect to the illuminable pane and being coated with a reflective layer, the reflective surfaces being configured such that light generated by the illuminating device can be reflected into the illuminable pane at such an angle that total reflection of the reflected light takes place in the illuminable pane.

15. A method comprising providing the arrangement with illuminable pane according to claim 1 in a vehicle of transport for traffic on land, in the air or on water, in a building, as a built-in part in furniture and appliances.

16. The arrangement according to claim 6, wherein the microprismatic film is bonded to the second pane surface.

17. The arrangement according to claim 9, wherein the illuminable pane is a single-pane safety glass.

18. The arrangement according to claim 11, wherein the illuminable pane is the inner pane of the composite pane.

19. The arrangement according to claim 13, wherein the functional layer is an IR-reflective layer.

20. The method according to claim 15, wherein the illuminable pane is a windscreen, a rear window, a side window and/or a roof window.

21. The arrangement according to claim 1, wherein the reflective surfaces are configured to reflect light incident on them by direct reflection.

* * * * *